United States Patent Office 3,383,590
Patented May 14, 1968

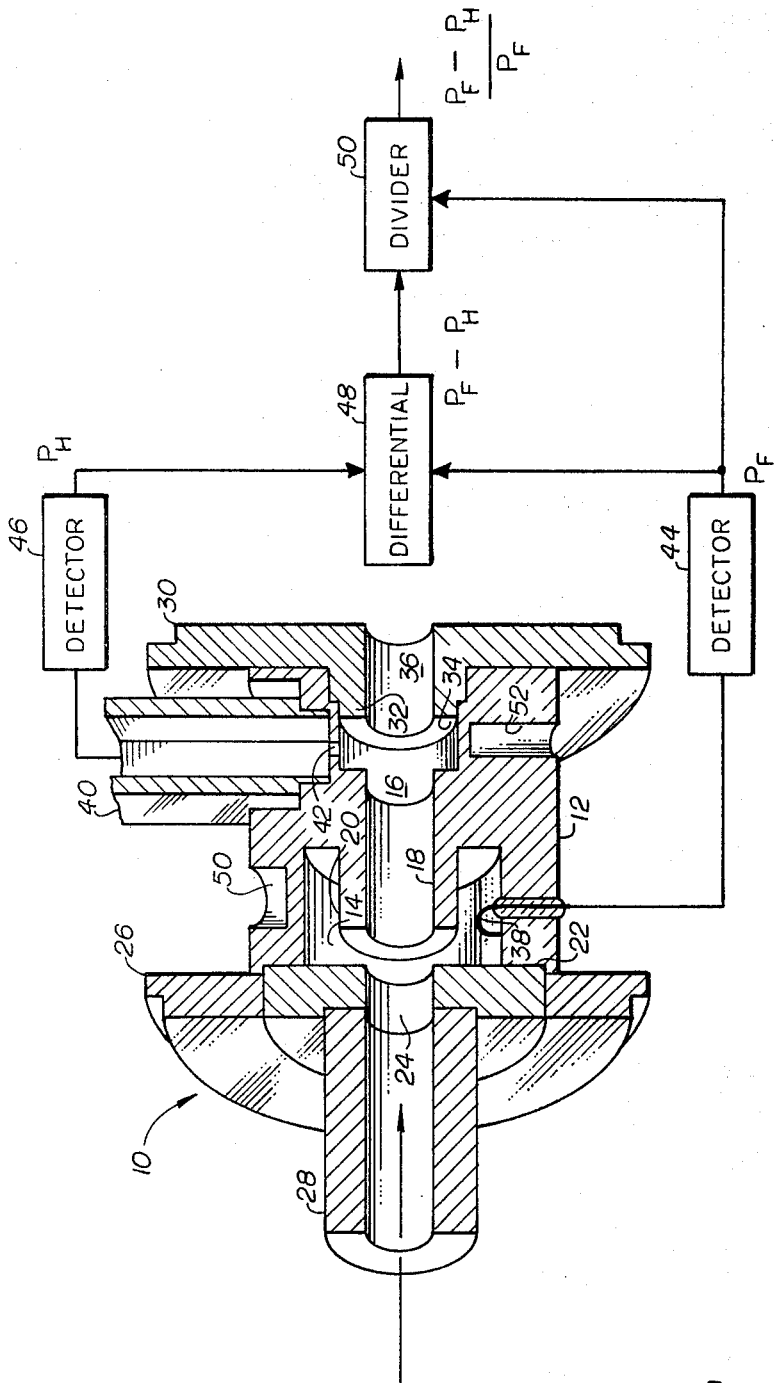

3,383,590
RESONANT CAVITY-TYPE MONITOR FOR MEASURING THE BUNCH LENGTH OF A BEAM OF CHARGED PARTICLES IN A PARTICLE ACCELERATOR
Roland F. Koontz, Menlo Park, and Robert H. Miller, Mountain View, Calif., assignors to the United States of America as represented by the United States Atomic Energy Commission
Filed Apr. 23, 1965, Ser. No. 450,561
3 Claims. (Cl. 324—58.5)

ABSTRACT OF THE DISCLOSURE

A beam bunch monitor inserted as a section of waveguide in a particle accelerator, and having a first cavity tuned to the fundamental beam bunch frequency, and a second cavity tuned to a selected harmonic. Fundamental and harmonic signals induced in the respective cavities by the beam bunches are extracted and applied to arithmetic circuits to derive an output signal equal to $(P_F-P_H)/P_F$, where $P_F$ is the power of the extracted fundamental signal, and $P_H$ is the power of the extracted harmonic signal. The derived output signal is proportional to the square of the bunch length and is therefore an indication of bunch length.

---

The invention disclosed herein was made under, or in, the course of Contract No. AT(04-3)-400 with the United States Atomic Energy Commission.

The present invention relates generally to particle beam monitors and more particularly to a double-cavity, charged particle, beam bunch monitor for measuring the length of bunches in a particle beam passing therethrough.

The magnitude of bunch lengths in a particle beam produced in an accelerator is an important parameter in the determination of the beam quality and of the energy spectrum of the beam, exiting at the end thereof. To this end, there are various types of bunch monitors available for measuring beam current and beam bunch configuration. For example, some of the more common devices used for the determination of bunch lengths are: a radio frequency beam sweeper which sweeps the beam laterally at the fundamental bunching frequency and displays the swept beam on a fluorescent screen—the width of the illuminated portion of the screen being an indication of the bunch size; and a cavity device which is adapted to resonate at a high harmonic wherein the power induced in the harmonic cavity is indicative of the bunch size. The above devices have inherent disadvantages which render their use as bunch length monitors unsatisfactory. The high harmonic cavity device intercepts and thus generally precludes further use of the beam. The beam sweeper employs a drift tube of long length, preventing the use thereof in beam devices where there are axial drift space limitations. Furthermore, the beam sweeper necessitates the application of large power inputs for proper operation thereof.

The bunch monitor of the present invention overcomes the above noted shortcomings by providing an extremely simple and relatively inexpensive device, which requires no external input power other than the beam, which does not intercept or significantly degrade the passing particle beam, and which adds a minimum of length to that of the beam accelerating structure.

Accordingly, it is an object of the present invention to provide a simple and effective beam bunch monitor capable of accurately measuring the length of particle bunches within a particle beam.

It is another object of the present invention to provide a beam bunch monitor capable of measuring the size of particle bunches passing therethrough without interrupting or otherwise degrading the particle beam.

It is still another object of the present invention to provide a particle beam bunch monitor, capable of sensing the length of a particle bunch within the beam and of generating a single output signal which is simply related to the sensed length.

Still another object of the present invention is to provide a particle beam bunch monitor capable of measuring the length of a particle bunch by comparing the power induced in a cavity tuned to the fundamental frequency of the beam, with the power induced in a second cavity tuned to a harmonic of the fundamental frequency.

Other objects and advantages will be apparent in the following description and claims considered together with the accompanying drawing in which the single figure is a sectional view of a particle beam bunch monitor in accordance with the present invention.

The present invention operates on the theory that a bunched particle beam, e.g., electron bunches induces a signal in a cavity upon passing therethrough. Given a particular beam frequency the sizes of a first and a second cavity can be determined such that the first or fundamental cavity will resonate at the fundamental bunching frequency of the particle beam, and the second or harmonic cavity will resonate at a preselected harmonic of the fundamental frequency upon passage of the beam successively through the cavities. The signals induced in each of the cavities can then be sensed and extracted and compared by any suitable means, such as an electronic detector circuit. According to the invention, the difference between signals induced in the two cavities varies as a function of the particle bunch length of the beam passing therethrough. Although the relationship of induced signal to bunch length does not vary linearly, the power coupled into the fundamental cavity minus the power coupled into the harmonic cavity, divided by the power coupled in the fundamental cavity is proportional to the square of the bunch length. That is:

$$L_e^2 \approx \frac{P_F P_H}{P_F}$$

Thus, when the signals are compared in a detector circuit, the signals induced by the passing beam in the cavities provides a single parameter readout which is simply related to the bunch length.

Referring now to the figure there is shown a cross-section of the beam bunch monitor 10 in accordance with the invention, including a simplified schematic of the associated electronic circuitry. The bunch monitor 10 comprises essentially a cylindrical central member 12 formed preferably of a generally cylindrical block of stainless steel, copper or similar metallic conductor. In accordance with the invention the central member 12 is suitably machined to form a first or fundamental generally annular cavity 14 at one end thereof, and a generally circular second, or harmonic cavity 16 at the opposite end thereof. A coaxially extending intermediate drift tube 18 is formed within the central member 12 along the center portion thereof, wherein the intermediate drift tube 18 communicates at one end with fundamental cavity 14 and at the other end with harmonic cavity 16 in axial alignment. As shown in the drawing, the drift tube 18 is actually formed by machining the cavity 14 out of the solid block of material of central member 12, wherein a portion of material in the shape of a hollow cylinder 20 is left along the central axis thereof, defining a reentrant end which protrudes a substantial distance coaxially into the cavity 14. End wall of the fundamental cavity 14 is formed by an annular plate 22 which is integrally secured as by welding or brazing to the corresponding end of the central member 12, and which has a central aperture 24 therethrough of a diameter equal to the diameter of the drift tube 18. An outer annular ring is secured circumjacent the annular plate 22 as by welding or brazing to form a flange 26 by which the related end of the bunch monitor 10 may be secured to the output port of an associated beam generating apparatus, e.g., an electron linear accelerator. The annular plate 22 and flange 26 are herein utilized for ease in assembly and construction of the device; however, it is obvious that they could be formed of a single circular piece of material having an aperture 24 therein. A hollow cylinder comprising an input drift tube 28, having an inside diameter equal to the diameter of the intermediate drift tube 18, is coaxially secured as by brazing or welding to the outer surface of circular plate 22, with the hole therethrough in register with the aperture 24, the latter forming part of the drift tube 28. A circular flange 30 is secured as by welding or brazing to the opposite end of the central member 12. The flange 30 has formed thereon a centrally extending hub 32, the outside circumference of which is machined to mate with the inside surface circumference of the respective end of central member 12. As may be seen the lateral surface 34 of the hub 32 lies normal to the beam path thus forming the one exit end wall of the harmonic cavity 16. A centrally extending aperture having a diameter equal to the diameter of the drift tubes 18 and 28 is formed through the hub 32 and flange 30, defining thereby an output drift tube 36.

To provide for extracting the signals from the fundamental and harmonic cavities 14, 16 respectively, means is provided for coupling to the fields within the cavities. Any of various methods for coupling a cavity to an outside circuit may be employed. By way of example only, means for coupling as shown herein, include a loop coupler 38 inserted radially through the wall of the cavity 14 to protrude therein in conventional orientation. Likewise, coupling is provided to the harmonic cavity 16 by machining a depression of suitable cross-section into the wall of the central member in alignment with the cavity 16 and by securing a waveguide connector 40 thereto by suitable means such as welding or brazing. A radially extending aperture 42 couples the cavity 16 to the waveguide connector 40. In the present device a waveguide connector is utilized with the harmonic cavity 16 to avoid large power losses which would occur when coupling harmonic power with coaxial connectors.

As shown in the simplified schematic the signals extracted by means of loop coupler 38 and waveguide connector 40 are introduced to detectors 44, 46 respectively, and are measured to define a signal $P_F$ generated in the fundamental cavity 14, and a signal $P_H$ generated in the harmonic cavity 16. The output signals $P_F$ and $P_H$ measured by the detectors 44, 46 are in turn introduced to an electronic differential circuit 48, wherein a single signal equal to the difference between the signals $P_F$ and $P_H$ is obtained. The single signal, $P_F-P_H$ is thereupon introduced to an electronic divider circuit 50. The fundamental signal $P_F$ is also introduced to the divider circuit 50, which then electronically divides the single signal $P_F-P_H$ by the fundamental signal $P_F$. The resulting output signal $(P_F-P_H)/P_F$ may then be introduced to a suitable display circuit for observation and/or recording as an indication of bunch length.

In order to provide means for tuning the cavities 14 and 16 the walls of the central member 12 are machined to form a thin walled section along a portion of the circumference thereof. For example, holes 50 and 52 may be formed into the wall of the central member 12 at points disposed radially outward from the cavities 14, 16 respectively. Tuning is accomplished in the usual manner, such as for example, by indenting the cavity walls at the bottom of said holes with a conventional waveguide tuning device.

As may be seen, the present invention comprises essentially a fundamental cavity in close proximity to a harmonic cavity and communicating therewith by means of a drift tube operating below cutoff frequency. The cavities 14, 16, and drift tubes 18, 28 and 36 lie along a common axis. The size of the fundamental cavity 14 is chosen relative to the frequency of the beam, in a manner well known in the art, and has a fairly low quality factor, Q, and a high shunt impedance. The Q of the cavities is determined by the desired rise time of the signals generated therein, and is preferably equal to approximately 300 for the fundamental cavity 14. Thus to allow equal signal rise times, the Q of the harmonic cavity 16, operating at the 5th harmonic, is of the order of 1500. As may be seen, the Q of the (fundamental) cavity is chosen low enough so that the rise time of the beam pulse will not be degraded. A shorter rise time requires a relatively lower Q value. The size of the harmonic cavity 16 depends in part upon the size of the fundamental cavity 14 and upon the number of the harmonic chosen at which the harmonic cavity will resonate. The higher the number of the harmonic chosen, the smaller the cavity 16 will be. The diameter of the drift tubes 18, 28 and 36 are likewise generally determined by the frequency; i.e., they are selected to operate below cutoff. Thus, the minimum diameter of the drift tubes 18, 28 and 36 will establish a limit to the number of the harmonic that can be used and still be below cutoff in the drift tubes. Generally, the higher the harmonic utilized the better the capability of the device for determining the length of the bunch passing therethrough. Accordingly, after the resonant frequency of the fundamental cavity 14 is determined there exists a range of harmonics at which the harmonic cavity 16 may be made to resonate. In general, the lowest harmonic which can be utilized is that harmonic which is just high enough in frequency to provide a measurable difference between it and the fundamental frequency. On the other hand, the highest harmonic utilized should be low enough that it will be easily distinguishable prior to the first null in the frequency spectrum; the spectrum being a sin $x/x$ distribution. Accordingly, as an example of a beam bunch monitor in accordance with the present invention, the fundamental cavity operates at 2,857 megacycles, the harmonic cavity 16 operates at the 5th harmonic, or at 14,285 megacycles, and the diameter of the drift tubes 18, 28 and 36 are chosen to operate below cutoff at the harmonic frequency. The inside diameters of the drift tubes 18, 28 and 36 are equal to 0.384 inch and the inside diameters of the cavities 14, 16 are equal to 1.20 and 0.70 inches respectively.

Other parameters which in part determine the size of the cavities utilized in accordance with the present invention are, first, the bandwith of the cavities, which should be the same for both cavities. Accordingly, the Q of the S band cavity is $1/n$ of that of the $n$th harmonic. This requirement is a result of the requirement that the rise time of the signals generated in the cavities should be the same to facilitate their comparison in the detector circuitry 44, 46. While the invention has been disclosed with respect to a single preferred embodiment it will be apparent to those skilled in the art that numerous and various modifications may be made within the spirit and scope of the invention and thus it is not intended to limit the invention except as defined in the following claims.

What is claimed is:
1. A charged particle beam bunch monitor for determining the length of charged particle bunches in a passing particle beam having a selected bunching frequency comprising:
 (a) first cavity means disposed in the path of said particle beam wherein passage of said beam therethrough generates therein a first cavity signal $P_F$;
 (b) second cavity means disposed in the path of said particle beam in close coaxial proximity to said first cavity means wherein passage of said beam there- through generates therein a second cavity signal $P_H$;

(c) means coupled to said first and second cavity for extracting said first and second cavity signals $P_F$ and $P_H$ respectively therefrom;

(d) electronic circuit means connected to said means for extracting said signals to measure the difference between said signals $P_F$ and $P_H$ and divide said difference by said first signal $P_F$ thereby obtaining an output signal indicative of said charged particle bunch length.

2. A charged particle beam bunch monitor in accordance with claim 1 wherein said first cavity resonates at the fundamental frequency of said selected bunching frequency, and said second cavity resonates at an $n$th harmonic of said fundamental frequency wherein $n$ is within the range of approximately three to thirty.

3. A charged particle beam bunch monitor for determining the length of charged particle bunches in a passing particle beam having a selected bunching frequency comprising;

(a) a cylindrical central member having a centrally extending axis therethrough;

(b) said member having a cylindrical first cavity coaxially machined into one end thereof, and a cylindrical second cavity coaxially machined into the opposite end thereof;

(c) said member having a coaxially extending aperture formed therethrough in communicating relation at either end thereof with said first and second cavities, said aperture being proportioned to operate below cutoff;

(d) means including a rectangular waveguide coupler secured to said central member in electromagnetically coupled relation to said second cavity;

(e) means including a coaxial loop coupler secured to said central member in electromagnetically coupled relation to said first cavity;

(f) electronic signal detector means connected to said waveguide and loop couplers for sampling signals generated within said cavities upon passage of said charged particle beam therethrough;

(g) electronic signal subtracting means connected to said signal detector means to measure the difference between the signals generated in said cavities;

(h) and electronic signal divider means connected to said signal subtracting means and adapted to divide the difference between said signals by the signal generated and sampled within said first cavity.

References Cited
UNITED STATES PATENTS

| | | | |
|---|---|---|---|
| 2,424,959 | 8/1947 | Alford | 315—5.43 |
| 2,466,704 | 4/1949 | Harrison | 315—5.43 |
| 2,605,444 | 7/1952 | Garbuny | 315—5.43 |

RUDOLPH V. ROLINEC, *Primary Examiner.*

P. F. WILLE, *Assistant Examiner.*